United States Patent Office 3,539,341

Patented Nov. 10, 1970

3,539,341

TRANSPARENCY COMPRISING POLYESTER SHEET COATED WITH ORGANOTITANIUM COMPOUND

Thomas J. Dolce, Menlo Park, and Donald L. McCabe, Rahway, N.J., assignors to Celanese Corporation, New York, N.Y., a corporation of Delaware No Drawing. Filed July 17, 1967, Ser. No. 653,624
Int. Cl. G03g *13/14*
U.S. Cl. 96—1.4 11 Claims

ABSTRACT OF THE DISCLOSURE

Transparencies are produced by forming an adherent image upon the modified surface of a transparent polyester sheet by transfer electrostatic copying. The transparent polyester sheet utilized in the invention possesses modified surface characteristics to improve adhesion which result from the application of an organotitanium compound.

BACKGROUND OF INVENTION

The invention relates to the production of transparencies which may be utilized in visual education presentations wherein images are commonly projected with magnification onto a screen for the simultaneous viewing by a plurality of observers. More particularly, the invention relates to an improved method for efficiently producing a transparency by forming an adherent image upon a polyester sheet.

It has been known for many years that the projection with magnification of an image present upon a transparency may serve as an effective means for conveying information to one or more observers. In some instances such a projection has been accompanied by a spoken or recorded narration or explanation. The production of suitable transparencies or slides of a permanent character suitable for use in such a presentation has, however, heretofore commonly required the skill of a trained technician and the substantial expenditure of time and money. For example, transparencies have heretofore commonly been formed by the photographic reproduction of the desired image. Such a photographic reproduction procedure has required the controlled exposure, development, washing, and fixation of a light sensitive compound present on a support with or without the intermediate production of a negative image. Other techniques utilized in the past for the production of transparencies include silk screening, and diazo processes. In order for a transparency to give satisfactory service particularly upon repeated use it is essential that the image formed upon the transparent support tightly adhere to same, and not be removed by handling or other contact commonly encountered during use.

It is an object of the invention to provide an efficient and economical process for the production of transparencies.

It is an object of the invention to provide a transparency of a permanent nature which is capable of withstanding repeated use.

It is another object of the invention to provide a process for the production of a transparency utilizing a transparent polyester sheet possessing improved slip characteristics upon which an adherent image of a permanent character is formed.

It is a further object of the invention to provide a process for production of transparencies which eliminates the need for the skill of a trained technician to produce the same.

These and other objects, as well as the scope, nature, and utilization of the invention will be apparent from the following detailed description and appended claims.

SUMMARY OF INVENTION

It has now been discovered that a process for the efficient production of transparencies comprises forming an adherent image upon a modified surface of a transparent polyester sheet by transfer electrostatic copying, said polyester sheet having at least one surface modified to improve adhesion by the presence of a coating thereon formed by applying to said surface a solution containing an organotitanium compound dissolved therein selected from the group consisting of: (a) a substantially anhydrous solvent containing a hydrolyzable alkyl titanate having at least one alkyl group of 1 to 8 carbon atoms, and (b) a solvent containing a reaction product obtained by reacting in a ratio of 1 to 4 mols of a compound selected from the group consisting of acetylacetone, ethyl acetonate, diethyl malonate, and malononitrile, with 1 mol of an alkyl titanate having 2 to 4 carbon atoms in each alkyl group; and after applying said solution, evaporating the liquid therefrom.

DESCRIPTION OF PREFERRED EMBODIMENTS

Suitable polyester sheet or film materials which may be used in the present invention are formed from condensation products of a bifunctional dicarboxylic acid and a dihydric alcohol and possess dimensional stability at elevated temperatures. The preferred condensation products are formed with aromatic dicarboxylic acids; however, products formed with dicarboxylic acids such as adapic, sebacic, etc. are likewise acceptable. For instance, such polyesters may be of the type described in Carothers U.S. Pat. No. 2,071,250. The polyesters may be composed of any of the high-melting difficulty soluble, usually microcrystalline, cold-drawing, linear, highly polymerized esters of terephthalic acid and glycols of the series $$HO(CH_2)_nOH$$

where $n$ is an integer within the range of 2 to 10, described in Whinfield et al., U.S. Pat. No. 2,465,319. The particularly preferred polyester is polyethylene terephthalate.

Moreover, the polyesters used in accordance with the present invention need not consist solely of dicarboxylic acid and simple glycol units since some of the glycol units may react to form polyglycols, and small percentages of such polyglycol units may also be present. For instance, when ethylene glycol is a reactant, the polyester may contain from 1 to 15 percent by weight of diethylene glycol units, i.e. $—CH_2CH_2OCH_2CH_2O—$.

Preferably, the polyester which is utilized in the process is a heat stable highly polymeric linear polyethylene terephthalate sheet which has been biaxially oriented and heat set to provide improved dimensional stability, such as described in Alles U.S. Pat. No. 2,779,684. Orientation and heat setting may generally be conducted either before or after the application of an organotitanium compound described in detail hereafter. It is preferred, however, that the organotitanium compound be applied after the polyester sheet has undergone such treatment. A suitable thickness for the uncoated film ranges from about 0.0005 inch to about 0.014 inch. A thickness of about 0.004 inch is particularly preferred.

Attempts to form an adherent image upon the unmodified surface of a polyester sheet by transfer electrostatic copying have resulted in failure. The image formed fails to tenaciously adhere to the sheet and is totally or partially displaced upon contact, thus either completely destroying the image or producing an excessive smudge which renders the transparency unsuitable for further use.

The surface of the polyester sheet utilized in the present invention has been previously modified to improve adhesion by the presence of a coating thereon derived from certain organotitanium compounds. The organotitanium compound may be either a hydrolyzable alkyl titanate having at least one alkyl group of 1 to 8 carbon atoms, or a reaction product obtained by reacting in a ratio of 1 to 4 mols of a compound selected from the group consisting of acetylacetone, ethyl acetonate, diethyl malonate, and malononitrile, with 1 mol of an alkyl titanate having 2 to 4 carbon atoms in each alkyl group.

The inclusion in the alkyl titanate of at least one alkyl group having 1 to 8 carbon atoms imparts to the former group of organotitanium compounds the capacity to readily undergo hydrolysis upon exposure to water, such as water vapor present in air. In a preferred embodiment of the invention the alkyl titanate utilized is a tetra-alkyl titanate having 1 to 8 carbon atoms in each alkyl group. Such tetra-alkyl titanates commonly possess a formula of $Ti(OR)_4$ where R is an alkyl group containing 1 to 8 carbon atoms. Illustrative examples of hydrolyzable tetra-alkyl titanates possessing a symmetrical molecular configuration include: tetramethyl titanate, tetraethyl titanate, terapropyl titanate, tetraisopropyl titanate, tetra-n-butyl titanate, tetraisobutyl titanate, tetrapentyl titanate, tetra(2-ethylhexyl) titanate, tetraoctyl titanate, and the like. The lower alkyl titanates containing 1 to 4 carbon atoms per alkyl group are particularly preferred. Such compounds are commonly light yellow liquids. Mixed alkyl titanates may also be utilized in which at least a portion of the alkyl groups on each molecule exceed 8 carbon atoms in length. For instance, compounds such as isopropyl stearyl titanate may be employed. It is also possible for the alkyl titanates to be partially condensed to form relatively low molecular weight polytitanates prior to their application to the polyester surface. As is well known in the chemistry of organotitanium compounds, such condensation products may result from the reaction of the alkyl titanate with less than the stoichiometric amount of water. For example, hexaisopropyl dititanate, or hexabutyl dititanate possessing structural configurations of $$(C_3H_7O)_3Ti—O—Ti(OC_3H_7)_3$$

and $(C_4H_9O)_3Ti—O—Ti(OC_4H_9)_3$ respectively, may be utilized. Commercially available alkyl titanates marketed under the trade designations of "Tyzor" TPT, "Tyzor" TBT, "Tyzor" TOT, "Tyzor" PB, and "Tyzor" AP by the DuPont Co. may be utilized as coating materials in the present invention.

The hydrolyzable alkyl titanates are preferably dissolved in a substantally anhydrous solvent in a concentration of 0.2 to about 50 percent by weight and uniformly applied to at least one surface of the polyester sheet. Illustrative examples of suitable solvents include: isopropyl alcohol, n-butyl alcohol, cyclohexane, n-heptane, octane, trichloroethylene, dioxane, petroleum ether, xylol, and the like. Relatively dilute solutions of the hydrolyzable alkyl titanates in an anhydrous solvent are particularly preferred, i.e. 1 to about 10 percent by weight. Minor quantities, i.e. up to about 5 percent by weight, of various compounds which are capable of retarding the rapid hydrolysis of the alkyl titanates may also be present in the solvent. Illustrative examples of suitable hydrolysis retarders are alcohols of more than 8 carbon atoms and their esters, normally solid hydrocarbons, normally solid chlorinated hydrocarbons, tertiary amines, and normally liquid polyhydroxy compounds containing from 2 to 8 carbon atoms. The solvent containing the alkyl titanate may be applied to the polyester sheet by any conventional coating technique which is capable of imparting a uniform transparent surface coating. The liquid is evaporated, and water vapor present in the air brings about hydrolysis of the alkyl titanate to modify the surface of the polyester sheet. Preferably the coated polyester is subjected to an elevated temperature, i.e. 100 to 150° C., in the presence of ordinary air for a few minutes immediately following application of the alkyl titanate. The thickness of the adhesion promoting coating produced by the alkyl titanate following evaporation of the liquid may generally range in a preferred embodiment from about 0.00001 inch up to about 0.0003 inch without appreciable impairment of the transparency of the polyester sheet.

In a particularly preferred embodiment of the invention the surface of the polyester sheet utilized in the present invention is modified to improve adhesion by the application of coating solution containing an organotitanium reaction product which is believed to be chelated in nature. The reaction product is formed by the reaction of either a beta-diketone (i.e. acetylacetone) or a keto-ester (i.e. ethyl acetoacetate, diethyl malonate, and malononitrile) with certain alkyl titanates. The acetylacetone, ethyl acetoacetate, diethyl malonate, and malononitrile coreactants are believed to serve as chelating agents in the reaction which produces suitable coating reaction products. The alkyl titanate coreactants utilized in the production of the reaction products possess a $Ti(OR)_4$ structure in which R is an alkyl group containing 2 to 4 carbon atoms (i.e. tetraethyl titanate, tetrapropyl titanate, tetraisopropyl titanate, tetra-n-butyl titanate, and tetraisobutyl titanate). The particularly preferred chelating agent is acetylacetone, and the particularly preferred alkyl titanate coreactant is tetraisopropyl titanate.

The organotitanium reaction products may be formed by simply mixing the chelating agent with the alkyl titanate coreactant in a mol ratio of 1 to 4 mols of chelating agent per 1 mol of the alkyl titanate. During the reaction, which is exothermic, a proportionate number of the alkoxy groups of the alkyl titanate are replaced, and may be recovered if desired as the corresponding alcohol by suitable distillation techniques, such as by distillation at relatively low temperatures under reduced pressure. If more drastic distillation procedures are attempted, polymeric insoluble condensation products tend to form. Distillation may be terminated when the stoichiometric quantity of alcohol is recovered. Particularly preferred organotitanium reaction products for use as coating materials in the instant invention are prepared by reacting approximately 2 mols of chelating agent per 1 mol of the alkyl titanate, so that approximately one-half of the alkoxy groups are replaced on each alkyl titanate molecule. For instance, if acetylacetone and tetraisopropyl titanate are the coreactants, the reaction product is believed to be largely di-isopropoxytitanium bis-(acetyl acetonate). Organotitanium reaction products suitable for use as coating materials in the present invention are available commercially under the trade designation of "Tyzor" AA organic titanate from the DuPont Co.

The organotitanium reaction products are generally yellow, orange, or red liquids, or similarly colored solids which are soluble in organic solvents such as alcohols, chlorinated hydrocarbons, hexane, heptane, and benzene. The reaction products alone tend to be insoluble in water, and are more resistant to hydrolysis particularly at room temperature than the simple alkyl titanates. When the liquid reaction products are added to water in amounts which exceed about 3 percent by weight, without modification as discussed hereafter, the instability of the mixture becomes apparent and a precipitate tends to form upon standing.

The coating solution which is applied to the polyester sheet contains the organotitanium reaction product completely dissolved therein so that a uniform continuous adhesion improving film or coating may be formed upon at least one surface of the polyester sheet. If desired, the coating solution may be formed by dilution of the reaction mixture which results in the formation of the reaction product, without the necessity of removing the alcohol by-product or any traces of dissolved chelating agent which did not enter into the reaction. The coating solution applied to the polyester sheet preferably is relatively dilute and contains about 0.2 to about 20 percent by weight of the reaction product dissolved therein. More concentrated solutions of the reaction product may be utilized, however, provided the solutions are modified to insure stability and/or used relatively soon after formation. In a particularly preferred embodiment of the invention the surface of a polyester sheet is coated by application of the reaction product from a solution containing about 0.2 to about 10 percent of this component by weight. The solution from which the reaction product is applied may be essentially anhydrous, however, in a preferred embodiment of a stable aqueous solution is employed. The stability of solutions containing a water component may be enhanced by the presence of a water-soluble acid which modifies the solubility in water of the reaction product, such as hydrochloric acid, formic acid, acetic acid, or propionic acid. When the pH of the coating solution is adjusted to below 4.5, and preferably to about 3.0, particularly stable aqueous solutions are produced. Such aqueous solutions may be conveniently formed by first combining the reaction product with the water-soluble acid, and then mixing this combination with water. Also, the addition of a water-miscible organic solvent to the water before mixing with the acidified reaction product tends to simplify the formation of the aqueous solution, and to reduce the amount of acid required. A particularly preferred acidified coating solution contains about 5 percent by weight of the reaction product, and about 50 percent by weight of water with isopropyl alcohol serving as the water-miscible organic solvent. When the organotitanium reaction product is applied from an essentially anhydrous solution, a wide variety of organic solvents may generally be utilized which may be either water-miscible or water-immiscible. Illustrative examples of suitable solvents include isopropyl alcohol, n-butyl alcohol, ethyl acetate, isopropyl acetate, chlorinated hydrocarbons, hexane, heptane, and benzene. Solutions in polar solvents are preferred since they tend to possess a greater degree of stability particularly upon standing for extended periods of time prior to use. The solvent utilized is not considered critical provided the reaction product is relatively stable therein, and the solvent is sufficiently volatile to be evaporated after the solution is applied.

The solution containing the organotitanium reaction product may be applied to at least one of the surfaces of a polyester sheet by any one of a variety of conventional coating techniques which are well known in the coating art, and the liquid evaporated. For instance, the polyester sheet may be simply passed through a hopper containing the solution which is provided with a doctor blade, or the solution may be applied by use of a more precise coating apparatus such as a gravure press. Drying may be accomplished by subjecting the sheet in the presence of atmospheric water vapor to an elevated temperature below that which would be harmful to the same to promote volatilization of the liquid, and the deposition of an adhesion improving coating upon the sheet. The passage of the sheet through a forced air circulating air oven maintained at about 150° C. for about two minutes may serve to promote efficient evaporation of the solvent. Preferably a sufficient quantity of the solution is initially applied so that upon evaporation of the liquid a uniform adhesion improving coating of at least about 0.00005 inch is produced. In a particularly preferred embodiment of the invention a coating of about 0.0002 to about 0.0003 inch is permanently imparted to the polyester sheet following evaporation. Even though the coating solutions described heretofore may be colored, the thin films which result from the evaporation of the liquid do not impair the clarity or color of the transparency ultimately produced.

The transfer electrostatic copying technique which is used to form an adherent image upon the polyester sheet according to the present invention has become extensively utilized in the office copying field in recent years and is well known. Many offices of even modest size and/or resources have readily available the necessary equipment for efficient electrostatic copying. Such equipment which has heretofore been utilized largely to copy various documents with the image being formed upon paper may according to the present invention also be utilized to efficiently produce transparencies of excellent quality. Office personnel such as secretaries who are familiar with the operation of electrostatic copiers can form transparencies using the instant process without the need for technical training.

As is well known, transfer electrostatic copying commonly involves imparting a uniform positive electrostatic charge to a photoconducting surface which will hold a charge only in the dark, such as a selenium coated drum. This may be accomplished by passing the drum under a series of corona-discharge wires in the dark. The photoconducting surface is then exposed through a lens system to a document or article bearing the image which is to be formed. In areas where light strikes the photoconducting surface the charge is dissipated and flows off through a conducting support to ground, with the positive electrostatic charge remaining largely intact in the image areas. Next negatively charged toner powder comprising a pigmented thermoplastic resin is cascaded across the photoconducting surface, and clings by electrostatic attraction to the positively charged areas of the surface. A sheet which is to receive the image is placed over the powder image, and is given a positive charge, such as by use of corona-discharge wires. As a result, a large portion of the negatively charged powder on the photoconducting surface is transferred to the sheet. Finally, the sheet is heated to melt the thermoplastic powder and bond the same to the sheet.

When it is desired to make multiple transparencies according to the present invention at a high rate of speed, the surface of each polyester sheet opposite the surface which receives the image may be covered with a transparent resinous slip coating so that the coefficient of friction between the surfaces present in a stack of the polyester sheets is lowered to insure single feeding of the same within a high speed electrostatic copier. However, the presence of the coating derived from the organotitanium compound does impart improved slip characteristics to the polyester sheet which in most instances makes possible satisfactory high speed feeding of the same without additional coating. Alternating sheets of paper or tissue with uncoated surface modified polyester sheets may also be used to insure proper feeding of the sheets into an electrostatic copier while making high speed multiple transparencies.

The following examples are given as specific illustrations of the invention. It should be understood, however, that the invention is not limited to the specific details set forth in the examples.

EXAMPLE I

A transparent biaxially oriented and heat set surface modified sheet (8½ x 11 inches) of polyethylene terephthalate possessing a melting point of about 265° C., and a thickness of 0.004 inch was placed in a Xerox 914 electrostatic copier. The selenium-coated drum of the copier was given a uniform positive electrostatic charge. The drum was exposed to a document bearing an intricate hand-drawn graph. Conventional thermoplastic toner powder possessing a negative charge was contacted with the surface of the drum. Next the sheet of surface modified polyethylene terephthalate was placed over the drum and given a positive electrostatic charge so that the image present upon the drum was transferred to the polyester sheet. The sheet was heated to 200° C. and the thermoplastic toner powder permanently adhered to the same to produce a transparency.

The modified surface characteristics of the polyethylene terephthalate sheet utilized in the production of the transparency were produced by coating the surface of the sheet with an aqueous solution containing a reaction product obtained by reacting in a ratio of 2 mols of acetylacetone with 1 mole of tetraisopropyl titanate, and after applying the solution, evaporating the liquid therefrom.

In preparation of the aqueous coating solution 1 part by weight of a 75 percent solution of the reaction product dissolved in isopropyl alcohol, was mixed with 1 part by weight of a 10 percent solution of acetic acid dissolved in water to form a homogeneous first mixture. The isopropyl alcohol solution of the reaction product which was subsequently combined with the acetic acid solution to form the first mixture was a commercially available solution designated as "Tyzor" AA organic titanate, and contained predominantly di-isopropoxytitanium bis-(acetyl acetonate) dissolved therein. Next, a second mixture was prepared by combining 6.5 parts by weight of water with 6.5 parts by weight of isopropyl alcohol. The first mixture and the second mixture were combined to provide the stable aqueous coating solution of the reaction product which was applied to the surface of the polyethylene terephthalate sheet.

The application of the solution was accomplished by contacting the sheet with a hard rubber roller which was supplied with the solution, and a uniform coating of the desired thickness was achieved by use of a conventional No. 4 Mayer bar. Upon placement of the sheet for two minutes in a forced air circulating oven maintained at 150° C. the liquid was volatilized, and a uniform adhesion improving coating of 0.0002 to 0.0003 inch thickness was imparted to the sheet which did not impair the transparency or color of the polyester sheet.

Next a sheet of oriented and heat set transparent polyethylene terephthalate identical to that previously described with the exception that it lacked any surface modification was run through the same electrostatic copier under the same conditions as described above.

The adherency of the images present on the sheets was tested by rubbing the same vigorously with the finger. The image fixation of the transparency formed according to the present invention was excellent, i.e. none of the image was removed. The image fixation of the transparency formed upon unmodified polyethylene terephthalate sheet was poor since the image was partially removed and smudged excessively under finger pressure.

EXAMPLE II

Example I may be repeated employing an identical biaxially oriented and heat set polyethylene terephthalate sheet to which a 2 percent by weight solution of tetraisopropyl titanate in n-heptane is coated, and the sheet dried by heating in a circulating air oven containing water vapor maintained at 150° C. for 2 minutes, to produce similar results.

The transparencies formed according to the present invention if desired may be mounted in frames of various sizes and used in conventional visual education projectors or for the preparation of tracings. It is also possible for a series of images to be formed adjacent each other on a roll of surface modified polyester sheet and the resulting transparency roll viewed by use of an overhead projector, or the like.

Although the invention has been described with preferred embodiments, it will be understood that variations and modifications may be resorted to as will be apparent to those skilled in the art. Such variations and modifications are to be considered within the purview and scope of the claims appended hereto:

We claim:

1. A transparency prepared by forming an adherent image upon a surface of transparent polyester sheet by transfer electrostatic copying, wherein said polyester is a condensation product of a bifunctional dicarboxylic acid and a dihydric alcohol, said polyester sheet having at least one surface modified to improve adhesion by the presence of a coating thereon formed by applying to said surface a solution containing an organotitanium compound dissolved therein selected from the group consisting of:

(a) an anhydrous solvent containing a hydrolyzable alkyl titanate having at least one alkyl group of 1 to 8 carbon atoms, and (b) a solvent containing a reaction product obtained by reacting in a ratio of 1 to 4 mols of a compound selected from the group consisting of acetylacetone, ethyl acetonate, diethyl malonate, and malononitrile, with 1 mol of an alkyl titanate having 2 to 4 carbon atoms in each alkyl group;

and after applying said solution, evaporating the liquid therefrom.

2. A transparency according to claim 1 wherein said polyester sheet is an oriented and heat set highly polymeric linear polyethylene terephthalate.

3. In a method for producing a transparency comprising forming an adherent image upon a surface of a transparent polyester sheet by transfer electrostatic copying, wherein said polyester is a condensation product of a bifunctional dicarboxylic acid and a dihydric alcohol, the improvement comprising modifying at least one surface of said transparent polyester sheet, by applying to said surface a solution containing an organotitanium compound dissolved therein so as to improve adhesion of said polyester sheet, said solution selected from the group conisting of:

(a) an anhydrous solvent containing a hydrolyzable alkyl titanate having at least one alkyl group of 1 to 8 carbon atoms, and (b) a solvent containing a reaction product obtained by reacting in a ratio of 1 to 4 mols of a compound selected from the group consisting of acetylacetone ethyl acetonate, diethyl malonate, and malononitrile, with 1 mol of an alkyl titanate having 2 to 4 carbon atoms in each alkyl group;

and after applying said solution, evaporating the liquid therefrom.

4. A method according to claim 3 wherein said polyester sheet is an oriented and heat set highly polymeric linear polyethylene terephthalate.

5. A method according to claim 3 wherein said polyester sheet has a coating formed by applying to said surface an anhydrous solvent containing a tetraalkyl titanate having 1 to 8 carbon atoms in each alkyl group, and after applying said solution, evaporating the liquid therefrom.

6. A method according to claim 3 wherein said polyester sheet has a coating thereon formed by applying to said surface a solvent containing a reaction product obtained by reacting in a ratio of 1 to 4 mols of acetylacetone with 1 mol of an alkyl titanate having 2 to 4 carbon atoms in each alkyl group, and after applying said solution, evaporating the liquid therefrom.

7. A method according to claim 6 wherein said polyester sheet is an oriented and heat set highly polymeric linear polyethylene terephthalate.

8. A method according to claim 6 wherein said alkyl titanate is tetraisopropyl titanate.

9. In a method for producing a transparency comprising forming an adherent image upon a surface of a transparent polyester sheet by transfer electrostatic copying, wherein said polyester is a condensation product of a bifunctional dicarboxylic acid and a dihydric alcohol, the improvement comprising modifying at least one surface of said transparent polyester sheet, by applying to said surface a solution containing an organtitanium compound dissolved therein so as to improve adhesion of said transparent polyester sheet, said solution containing about 0.2 to about 20 percent by weight of a reaction product obtained by reacting in the ratio of 1 to 4 mols of acetylacetone with 1 mol of an alkyl titanate having 2 to 4 carbon atoms in each alkyl group, and after applying said solution, evaporating the liquid therefrom.

10. A method according to claim 9 wherein said solution contains about 0.2 to about 10 percent by weight of an acetylacetone-alkyl titanate reaction product formed by the reaction in the ratio of about 2 mols of acetylacetone with 1 mol of said alkyl titanate.

11. A method according to claim 10 wherein said alkyl titanate is tetraisopropyl titanate.

References Cited

UNITED STATES PATENTS

| | | | |
|---|---|---|---|
| 2,855,324 | 10/1958 | Van Dorn | 117—25 |
| 2,917,414 | 12/1959 | McLean | 117—221 |
| 3,275,436 | 10/1966 | Mayer | 96—1 |

GEORGE F. LESMES, Primary Examiner

M. B. WITTENBERG, Assistant Examiner

U.S. Cl. X.R.

117—72, 211, 212